(No Model.)
G. W. MOFFITT.
LISTED CORN CULTIVATOR.
No. 338,180. Patented Mar. 16, 1886.
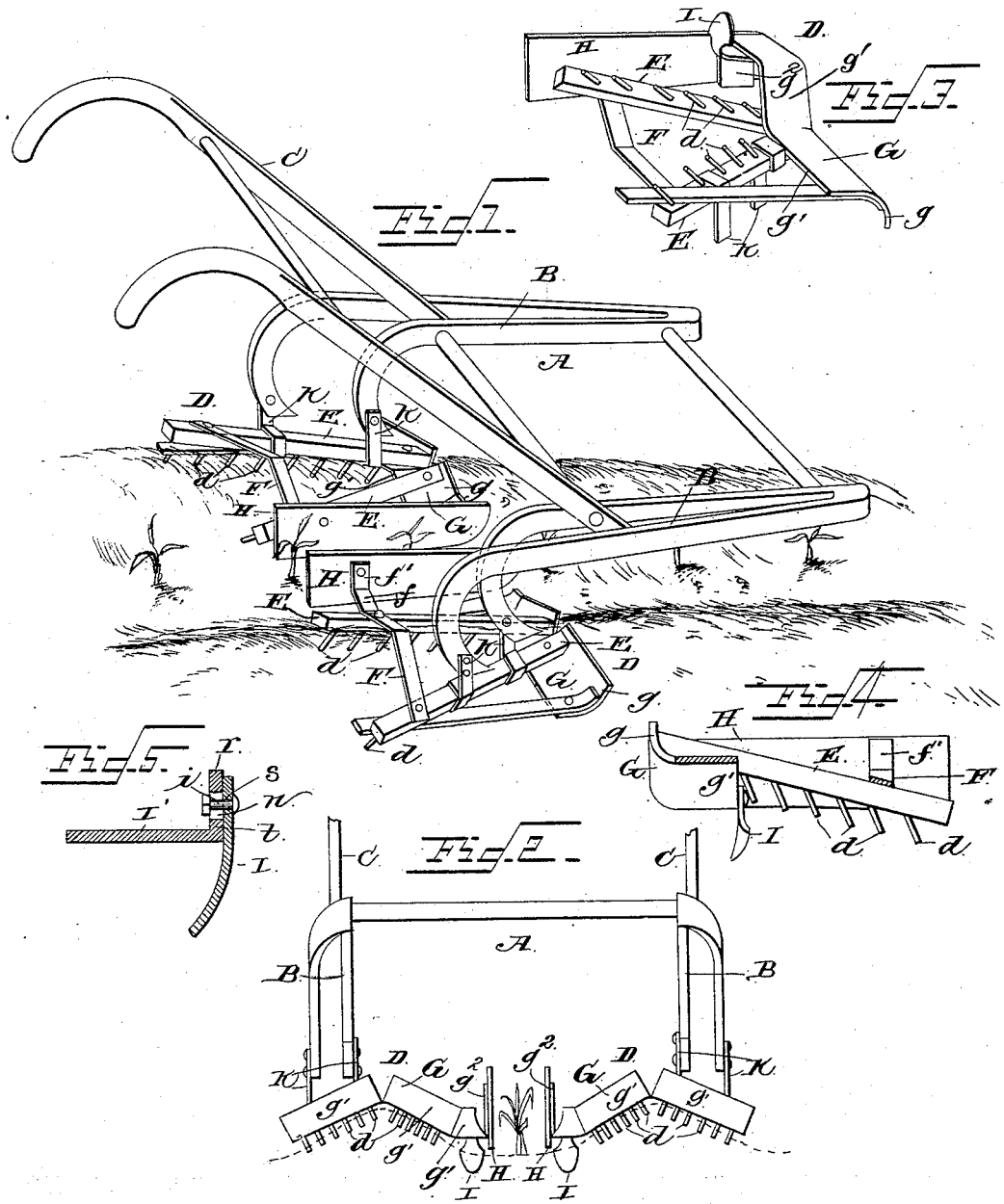
Witnesses
M. E. Fowler
J. W. Garner
Inventor
G. W. Moffitt
By his Attorneys
C. A. Snow & Co.

United States Patent Office.

GEORGE W. MOFFITT, OF FRANKFORT, KANSAS.

LISTED-CORN CULTIVATOR.

SPECIFICATION forming part of Letters Patent No. 338,180, dated March 16, 1886.

Application filed January 2, 1886. Serial No. 187,428. (No model.)

*To all whom it may concern:*

Be it known that I, GEORGE W. MOFFITT, a citizen of the United States, residing at Frankfort, in the county of Marshall and State of Kansas, have invented a new and useful Improvement in Listed-Corn Cultivators, of which the following is a specification, reference being had to the accompanying drawings.

My invention relates to an improvement in listed-corn cultivators; and it consists in the peculiar construction and combination of devices, that will be more fully set forth hereinafter, and particularly pointed out in the claims.

In the accompanying drawings, Figure 1 is a perspective view of my invention completed. Fig. 2 is a front elevation of the same. Fig. 3 is an inverted perspective view of one of the cultivating-frames. Fig. 4 is a longitudinal sectional view of the same. Fig. 5 is a detailed view of the spoon-shovel.

Listed corn is planted in a furrow having a ridge on either side, and it has been heretofore difficult to cultivate the corn during the early stages of its growth, and to keep it free from weeds, thus seriously retarding the growth of the young plants. This function it is the object of my invention to perform.

A represents the usual double-shovel-cultivator frame, having the diverging beams B and the handles C. This frame is sometimes attached to a sulky or riding frame in the usual way, but is here shown as being detached therefrom for the sake of convenience.

D represents my improved cultivator-frames, each of which has diverging beams E, arranged similarly to the shape of an ordinary A-harrow.

F represents a connecting-bar, which is bent to form an oblique angle, and is attached to the beams E near the rear ends thereof. The inner end of this bar is first bent upwardly at an angle, as at $f$, and then vertically, as at $f'$. The front ends of the beams E are attached to a shoe, G, which is formed substantially in the shape of the bar F, and has its front side curved to form a runner, as at $g$. This shoe is provided at its inner end with the inclined portion $g'$ and the vertical portion $g^2$, corresponding in shape with the parts $f$ and $f'$ of the bar F.

H represents a fender, which is formed of sheet metal, is rounded at its front end, and gradually widened toward its rear end. This fender is bolted to the parts $f'$ and $g^2$ of the frame, and is supported vertically thereby.

I represents a spoon-shovel, which is bolted to the part $g'$ on the inner side of the fender, and the beams E are provided on their lower sides with the rearwardly-inclined harrow-teeth $d$.

The frames D are made alike, one being attached to the right-hand beam of the frame A, and the other being attached to the left-hand beam thereof by means of vertical standards K, which are secured to the beams E. It will thus be seen that the fenders are opposed to each other and situated at a suitable distance apart.

The operation of my invention is as follows: As the cultivator is drawn along, the frames D run on the upper sides of the ridges on each side of the furrow, and the shovels I work in the said furrow on each side of the row of plants, thus thoroughly stirring the soil around them. The harrow-teeth which work on the sides of the ridges destroy the weeds, and the fenders prevent clods, which may roll down the sides of the ridges, from falling against the young plants. The shoes having the curved front sides pulverize the earth in advance of the harrow-teeth.

In Fig. 5 I illustrate devices by means of which the spoon-shovel may be adjusted vertically and caused to run in the ground at any desired depth. The shovel I is made separate from the bar I', and has on its upper end a stud, $r$, having a transverse opening, $s$. The bar I' is adapted to be bolted at its front end to the part $g'$ on the inner side of the fender, as hereinbefore described, and the rear end of the said bar is upturned, as at $t$, and provided with a vertical slot, $n$. A bolt, $i$, passes through the opening $s$ in the shovel and through the slot, and thereby secures the shovel to the bar I', and admits of its being vertically adjusted.

Having thus described my invention, I claim—

1. The frame D, comprising the diverging beams E, having the harrow-teeth on their lower sides, the bar F at the rear end of the frame, and bent in the form of an oblique angle, and thereby adapted to the shape of the ridge, and having the inner extended end, the shoe G, formed substantially like the bar F, and attached to the front end of the frame, the vertical fender attached to the inner ends of the bar F, and the shoe G, and the cultivator-teeth working on the inner side of the fender, substantially as described.

2. The cultivator having the opposing frames adapted to the shape of the ridges, the harrow-teeth extending from the frames, the shovels on the inner side of the harrow-teeth, and the fenders on the inner side of the frame, as set forth.

3. The frame D, made substantially in the form of an obtuse angle in cross-section, and having teeth depending therefrom, shovels on the inner side of the teeth, and the fenders on the inner side of the frame, as set forth.

In testimony that I claim the foregoing as my own I have hereto affixed my signature in presence of two witnesses.

GEORGE W. MOFFITT.

Witnesses:
HUGH G. TROSPER,
JOHN SHEARER.